US005738793A

United States Patent [19]
Janks et al.

[11] Patent Number: 5,738,793
[45] Date of Patent: Apr. 14, 1998

[54] METHOD FOR REMOVING BENZENES FROM WATER

[75] Inventors: John Seager Janks; Deanna Rea Pfann, both of Houston, Tex.

[73] Assignee: Texaco Inc., White Plains, N.Y.

[21] Appl. No.: 554,941

[22] Filed: Nov. 13, 1995

[51] Int. Cl.[6] ........................................... C02F 1/28
[52] U.S. Cl. .................. 210/671; 210/673; 210/680; 210/691
[58] Field of Search ........................ 210/671, 673, 210/680, 691, 924

[56] References Cited

U.S. PATENT DOCUMENTS

| | | | |
|---|---|---|---|
| 236,384 | 1/1945 | Tymstra et al. | 210/680 |
| 4,481,113 | 11/1984 | Canevari | 210/680 |
| 4,517,094 | 5/1985 | Beall | 210/691 |
| 5,186,819 | 2/1993 | Kaul et al. | 208/310 |

OTHER PUBLICATIONS

Article No. SPE 22833, Identification and Properties of Modified Zeolites for the Removal of Benzene, Toluene and Xylene From Aqueous Solutions, J.S. Janks, Texaco Inc. and F. Cadena, New Mexico State U., Copyright 1991, *Society of Petroleum Engineers, Inc.*

Produced Water, *Technological/Environmental Issues and Solutions*, Edited by James P. Ray, Shell Oil Company, Houston, Texas, and F. Rainer Engelhardt, Marine Spill Response Corporation, Washington, D.C., Plenum Press, New York 1992.

*Primary Examiner*—Ivars Cintins
*Attorney, Agent, or Firm*—Henry H. Gibson; John R. Kirk, Jr.

[57] ABSTRACT

A method for tailoring naturally occurring zeolite materials with silane compounds and using such silane tailored naturally occurring zeolite solid sorbent materials to remove benzenes and alkyl benzenes (BTEX) from contaminated water streams is described.

8 Claims, 6 Drawing Sheets

METHOD FOR REMOVING BENZENES FROM WATER

FIELD OF THE INVENTION

This invention relates to the removal of aromatic contaminants, particularly benzene, lower alkyl and alkene-benzenes from contaminated water streams using a tailored, naturally occurring zeolite catalyst. The naturally occurring zeolite is reacted with a primary polar silane and a secondary nonpolar silane.

BACKGROUND OF THE INVENTION

Zeolites have long been used as adsorbents for the separation of aromatic materials, particularly benzene and toluene from other hydrocarbons and from water. Many water streams, particularly those occurring from the production of crude oil, contain benzene and alkyl benzenes such as toluene, ethyl-benzene and xylene (BTEX). These benzenes have been sources of problems for purity, not only in the production of gasoline and other hydrocarbons, but in the recovery of the water contaminated by such materials. This water, whether it comes from the production of hydrocarbons or through seepage from underground storage tanks or surface runoff water at hydrocarbon processing facilities, has presented a myriad of cleanup problems.

Water is often highly contaminated with these benzenes because of the relatively high water solubility of these compounds. In the production of hydrocarbons these alkyl benzenes are commonly known as BTEX. While the practice of the described invention or even the attempts of the prior art have not been limited to the removal of BTEX, some notable attempts have been made. In the first instance, while widely used for hydrocarbon separation, synthetic zeolites are disregarded because of their cost and the inherent expense of using such materials for this purpose. Previously, benzene and other substituted benzenes have been removed from aqueous streams by filtering through clays such as bentonite and montmorillonite, as well as through beds of granular activated carbon. While some degree of removal can be accomplished, the cost, the lack of specificity of the material removed, and the difficulty in filter recovery have militated against successful application, particularly in connection with the cleanup of large quantities of water.

Naturally occurring zeolites have also been used with varying degrees of success, but always with reliability problems. In fact, the prior art has discussed the tailoring, or modification, of such natural zeolites as described in Article No. SPE 22833, *Identification and Properties of Modified Zeolites for the Removal of Benzene, Toluene and Xylene From Aqueous Solutions*, J. S. Janks, Texaco Inc. and F. Cadena, New Mexico State U., Copyright 1991, *Society of Petroleum Engineers, Inc.* In this discussion, the naturally occurring zeolite is reacted with a variety of amines and diamines to form the tailored material with the unreacted site always having a reactive group available. The technology discussed in the SPE Article was amplified by the same authors, in *Produced Water, Technological/Environmental Issues and Solutions*, Edited by James P. Ray, Shell Oil Company, Houston, Tex., and F. Rainer Engelhardt, Marine Spill Response Corporation, Washington, D.C., Plenum Press, New York 1992.

Even with the improvement brought about by these investigations, substantial room is left toward the achievement of virtual quantitative removal of the BTEX from contaminated water. Accordingly, it is an object of this invention to provide a tailored naturally occurring zeolite sorbent material which is useful for the removal of benzene and alkyl benzenes, particularly BTEX, from contaminated water streams.

It is another object of this invention to provide a successful method using the tailored, naturally occurring zeolite sorbent material to clean water, at least to the point where it may be disposed of in an environmentally benign manner.

It is further the objective of this invention to provide a solid sorbent material which allows for the large scale removal of aromatic materials from waste water streams.

It is a still further object to provide a method of treating a naturally occurring zeolite to create the silane coating for the material.

SUMMARY OF THE INVENTION

In accordance with the present invention and the achievement of the foregoing objectives, there is provided a solid sorbent material created from naturally occurring zeolites by tailoring these zeolites through reaction with a primary polar silane and a secondary nonpolar silane. Preferably, the secondary nonpolar silane is an amino silane, which functions as a promoter. The organo silanes used in the practice of this invention are mixed in a carrier fluid and the zeolite is tailored by the reaction of the silane with the zeolite, which is separated from the carrier fluid and baked in an oven to achieve permanence of coating. It is also an advantage of this invention that the tailored zeolite may be recovered efficiently once capacity for hydrocarbon removal is reached. Separation of the benzenes from the column, regeneration, and reuse can all be achieved on-line in the flow-path of a contaminated water stream.

The tailored zeolite is formed from a naturally occurring zeolite, preferably a clinoptillolite which may include some smectite clays in its structure. The tailoring, or coating materials, are a mixture of two silanes at a minimum; a primary polar silane, preferably vinyltriacetoxy silane, and a secondary nonpolar silane, preferably styrylamine silane, which acts as a promoter to facilitate bonding between the silanes and the zeolite. Preferably, a third nonpolar silane, phenylmethoxy silane, is used. All three silanes react with the zeolite reaction sites to form the adsorbent coating.

The styrylamine silane prevents the polymerization of itself and the other silanes during the blending step of the coating process and in the presence of water under filtration conditions. With the use of three silanes, column life was lengthened and BTEX removal was significantly increased.

The carrier solution for blending the silanes is preferably a lower alcohol such as methanol through butanol, more preferably a propanol, most preferably isopropanol and water. The naturally occurring zeolite is added while mixing continues for from 4 to 6 hours. The alcohol is decanted from the zeolite which is placed in an oven to bake at a temperature of from 100° C. to about 120° C. overnight, from 12 to about 15 hours. The baked zeolite material is then tailored with the silane formulation and prepared for use by packing in a column through which contaminated water is passed. Water treatment may be either upward or downward, preferably downward, through the packed bed.

Once the removal capacity of the silane is reached, the silane treated zeolite can be easily regenerated and reactivated for subsequent use, by draining the column, and passing a hot gas through the packed bed to strip off the benzenes recovered from the water stream. In field use it would be preferable that the columns be operated in parallel such that some zeolite benzene removal beds may be stripped of the aromatic materials removed from the contaminated water, reactivated and put back into use without interrupting the overall decontamination process.

DETAILED DESCRIPTION OF THE INVENTION

Figure 1:
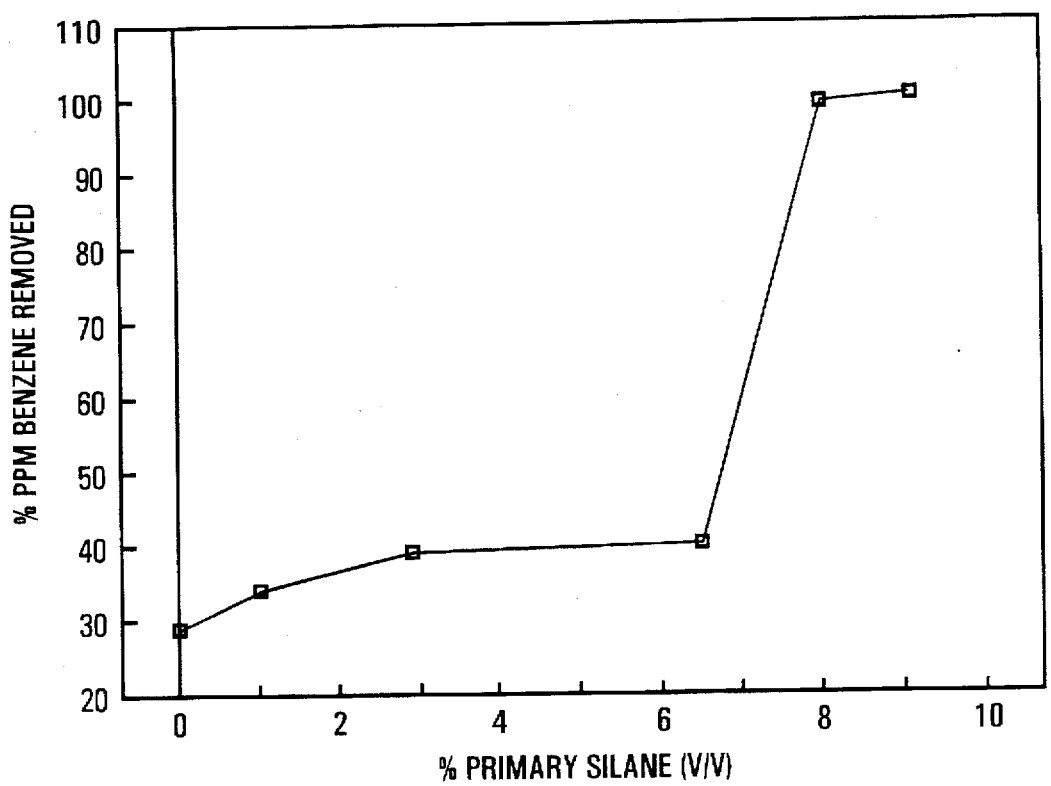
FIG. 1 is a graph which shows the removal of benzene based upon the amount of primary polar silane on the zeolite surface.

The objectives of this invention are accomplished through the tailoring of naturally occurring zeolites by reaction with a specific silane combination. It has been found that when tailored in this manner, these modified, naturally occurring zeolites effectively remove aromatic hydrocarbons such as benzene and alkyl benzenes from large quantities of water, when used as a packed bed through which contaminated aqueous streams are passed. The vessels used for such operations can be large and in a plant setting or small, portable vessels which are readily transportable to location where cleanup is needed.

The zeolites are a porous material and in their natural state may have a clay content. The preferred zeolite for use in the practice of this invention is a non-toxic, naturally occurring soil composed of clinoptillolite, quartz, opal-CT and montmorillonite. The clay material is most often a smectite, typically montmorillonite. The zeolite is highly porous and capable of sustaining a continuous standard flow rate highly comparable to clean up rates normally expected in on-line operations.

A relationship was noted between an increased amount of montmorillonite present and a tendency of enhanced adsorbency of clinoptillolite, which is a three-dimensional structure consisting of many internal and external reaction sites for the reactive silanes. This three-dimensional surface area increases greatly the retention time possible for the removal of BTEX from waste streams.

The preferred zeolite having high montmorillonite content is sold under the trademark Zeobrite Soft by Zeotech Corporation, Albuquerque, N. Mex., with the lowest montmorillonite containing clinoptillolite zeolite known as Zeobrite Hard. Of course, the determination that other naturally occurring zeolites could be useful in the practice of this invention may be made with only simple experimentation following the discussion which follows in order to adapt them for use in the practice of this invention. These naturally occurring zeolites are described in detail in the above identified SPE Paper No. 22833 and represent information well known in the art. Other species of naturally occurring zeolites for use in this invention are, for example, mordenite, heulandite, analcime, chabazite, and laumentite.

In preparing the tailored zeolite solid sorbent material used in the columns of the invention experiments, a product passing about a 40 mesh screen was used. Surprisingly, it was discovered that even the fines participate in the removal of the BTEX contaminants from the water stream.

The materials for tailoring the zeolite to form the solid sorbent material using the practice of this invention are preferably a three component silane formulation. The preferred primary silane component, vinyltriacetoxy silane, contains polar functional groups. The secondary silanes, styrylamine silane, the promoter, and phenylmethoxy silane, are both nonpolar. The silanes used in coating the zeolite are in respective volume ratios of about three to one in primary silane to each of the secondary silanes. The promoter silane, styrylamine silane, reacts with the zeolite and stabilizes the presence of the other silanes in the zeolite-silane lattice structure until curing takes place. This prevents deterioration of the column while in use.

The clay component in the naturally occurring zeolite material is often called smectite, which in everyday usage may be interchangeable with bentonite and montmorillonite. These clays are well recognized as "swelling clays" when brought into contact with water. While previous attempts to tailor zeolites as discussed in the background of this invention, the amount of tailoring material is relatively independent of the cation exchange capacity of the zeolite, which is in some part a function of the clay content.

In the practice of this invention, the primary polar silane is present in the solution for preparing the zeolite in amounts of at least about 5%, preferably from about 5% to about 10% by volume based upon the volume of original undiluted carrier solution (usually isopropanol and water), most preferably being from about 6% to about 10% by volume. The information depicted in FIG. 1 and FIG. 2 demonstrate the importance of these percentages to accomplish removal of BTEX from water. Accordingly, the secondary, nonpolar silanes will be adjusted to maintain the approximate ratios, volume to volume, of about 1.5:1 to about 4:1 primary silane to secondary silane, the preferred range being about 2:1 to about 3:1 volume ratio of primary polar to secondary nonpolar silanes in an isopropyl alcohol tailoring solution.

The primary silane was combined with the zeolite, during tailoring, in a believed optimum amount of approximately 24% (V/V ratio of primary silane to zeolite, 60 ml primary silane with 250 ml zeolite granules). The secondary silanes were each combined with the zeolite, in an optimum amount of approximately 8% (V/V ratio of secondary silanes to zeolite). One skilled in the art following these criteria and the tailoring procedures set forth below will enjoy the advantages of the practice of this invention.

Figure 3:
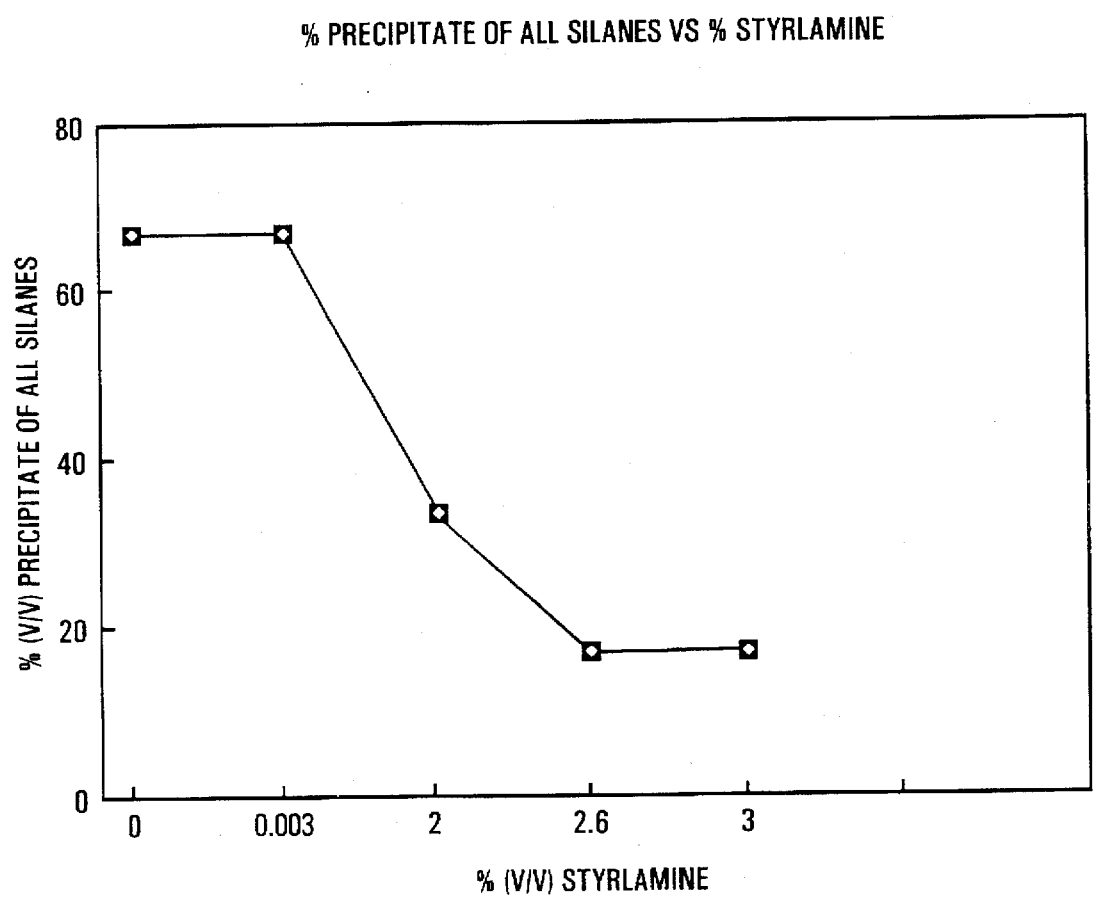
FIG. 3 is a graph which shows the relationship between the formation of silane precipitant and the amount of primary polar silane used in tailoring the zeolite.

The amino silane promoter is present in the solution in amounts of from an effective amount to about 3% (volume of silane to original undiluted volume of carrier solution). Silanes are well known chemical molecules having reaction sites compatible with the zeolites. Those skilled in the art will have no trouble obtaining satisfactory tailoring polar or nonpolar silanes with preferred silanes being obtained from Union Carbide or Dow Corning. The molecular weight of the silane is not particularly critical and those skilled in the art may be guided by cost considerations and performance screening resulting from simple tests. Surprisingly, increasing the amount of the amino silane promoter inhibits the precipitation phenomena and small amounts as set forth herein have been found to be effective. The information displayed in FIG. 3 shows the percentage precipitation and its variance with the increase of the preferred promoter silane (styrylamine silane). In fact, styrylamine silane was substantially more effective in reducing fines migration than other secondary silanes tested. As can be seen, an effective amount is present between about 0.003 and about 2 volume percent level.

Tailoring the Zeolite

The zeolite is tailored by first preparing the silane mixture by adding the desired amounts to isopropyl alcohol and blending with vigorous mixing for from about 3 to about 4 hours to obtain the tailoring solution. The primary silane is added first. This is followed by the secondary nonpolar silanes with mixing in between additions. Following the addition, continuous stirring is maintained to prevent the coagulation and ultimate precipitation of the silane molecules. The zeolite, preferably crushed and sized, in a preferred amount of about 42% zeolite (Vol. zeolite to Vol. isopropanol and water), is then added slowly to the silane isopropyl alcohol and water solution with mixing continued for about three to four hours of the addition. Precipitation of silanes in the solvent mixture can be monitored by decanting a small amount into another vessel for observation.

The solids are then separated from the remaining solution and baked at a temperature of from about 100° to about 120° C., preferably from about 105° to about 110° C. Baking is continued for a sufficient period of time to dry the zeolite and cure the silane coating. Overnight is a convenient period. The preferred time for this heating step is from about 8 to about 15 hours, most preferably 10 to 12 hours, which renders the tailoring virtually impervious to subsequent separation in the practice of this invention.

Example of Preparation

The silanization of the zeolite was conducted by the following procedure. A tri-pour plastic beaker was filled to a 500 ml volume with isopropyl alcohol, and then to the 600 ml mark with deionized water. This solution was mixed with a blender at a rheostat power setting of 30. The primary silane (vinyltriacetoxy compound) was added (60 ml) and then the secondary compounds—styrylamine and phenylmethoxy silanes—were added consecutively (20 ml each). Continuous stirring was maintained during addition and afterward, to prevent aggregation of the silane molecules and reduce subsequent polymerization. The volume ratio of primary to secondary silanes was three to one.

At this time a 250 ml volume of zeolite was slowly added to the mixing solution. The zeolite used was a clinoptillolite zeolite containing montmorillonite clay and sold as "Zeobrite Soft" by Zeotech Corporation, Albuquerque, N. Mex. The mixing procedure was then continued for three to four hours.

A 40 ml volume of the decant was extracted into a clear glass bottle, to assess the percent V/V precipitation of silanes which did not coat the zeolite in the carrier mixture. The remaining decant was separated from the zeolite solids. The solids were transferred to a glass container and placed in an oven to bake overnight at a temperature of 105° to 110° C. Zeobrite Soft (mesh size =14) was experimentally found to achieve the best performance of the zeolites tested. It is believed that the presence of some montmorillonite in the zeolite improved performance because the testing of Zeobrite Hard with the same 85% clinoptillolate content as the Zeobrite Soft, but lacking the montmorillonite, was less successful. A clinoptillolite zeolite was selected because of the presence of more reactive sites for the silane zeolite reactions. For clarity, the I.U.P.A.C. names for the silanes used are as follows: Vinyltriacetoxy silane=Vinyltriacetoxy silane (Product No. Z6075), styrylamine silane=N-(2-(Vinylbenzylamino)-ethyl-3-amino-propyltrimethoxysilane, monohydrogen chloride (Z6032), and Phenylmethoxy silane=Phenyltrimethoxysilane (Product No. Z6124). The silanes above were obtained from Dow Corning Corporation, Midland, Mich. 48686-0994.

Practice of the Method of this Invention to Remove Aromatic Hydrocarbon Contaminants The method of this invention preferably contemplates the creation of columnar beds packed with the zeolite sorbent material tailored as set forth above operating in parallel such that when one packed vessel reaches its adsorption capacity, it can be taken off-line for regeneration with the second one is brought on-line.

Traditional engineering principles may be used to design the size and dimensions of the vessels to be packed with the tailored zeolite material to match the flow rate of the process system involved and yet achieve proper residence time for treatment. Because of the highly porous nature of the zeolites, the beds may be relatively tall. The flow rate of contaminated water through the tailored zeolite may be from about 0.05 to about 0.2 bed volumes per minute with a preferred flow rate of the contaminated water of about 0.1 bed volumes per minute, comparable with normal on-line cleanup rates. Empirical data based upon the BTEX loading of the contaminated water and the flow rate given the tailoring of the zeolite would lead, with simple experimentation, to a determination of the length of time it should take to use the capacity of a particular zeolite bed before breakthrough of the benzene or alkyl benzenes. Analysis of the effluent is also possible which can lead to automated control of the process.

Example of Operation

Field conditions were simulated for groundwater cleanup to test the silanized zeolites. Burette-type fritted columns were used, which were 25 inches in height with inner diameter of 1 inch. The columns were packed with silanized zeolite prepared as described above to a height of 17.5 inches, with a 1 inch quartz wool plug at the bottom. Deionized water was used to hydrate and transfer the silanized zeolite to the column. The loading procedure consisted of adding 120 ml of the zeolite in the form of a packing-water slurry, occasionally draining the excess water through the bottom of the column.

A continuous standard downward flow rate of approximately 0.1 bed volumes per minute (4 ml/min) was maintained during the exhaustion step for all tests conducted. The concentration of the test solution ranged from 30 to 40 ppm of benzene and toluene. Care was taken to maintain a constant liquid head over the top of the column—to keep the packing completely submerged in liquid and maintain a constant change in pressure vertically across the column. All eluent and eluate solutions were analyzed by gas chromatography with a Hewlett Packard 5890 using standard analytical techniques.

Figure 2:
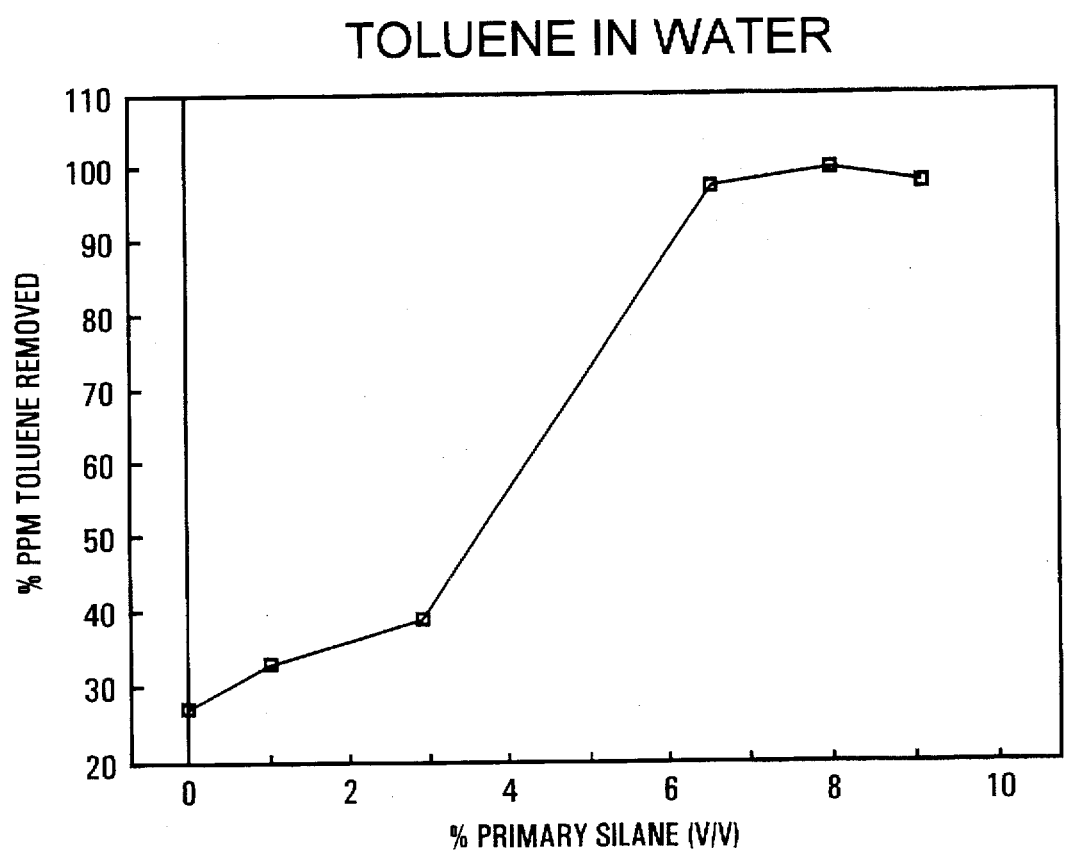
FIG. 2 is a graph which shows the removal of toluene based upon the amount of primary polar silane on the zeolite surface.
Figure 4:
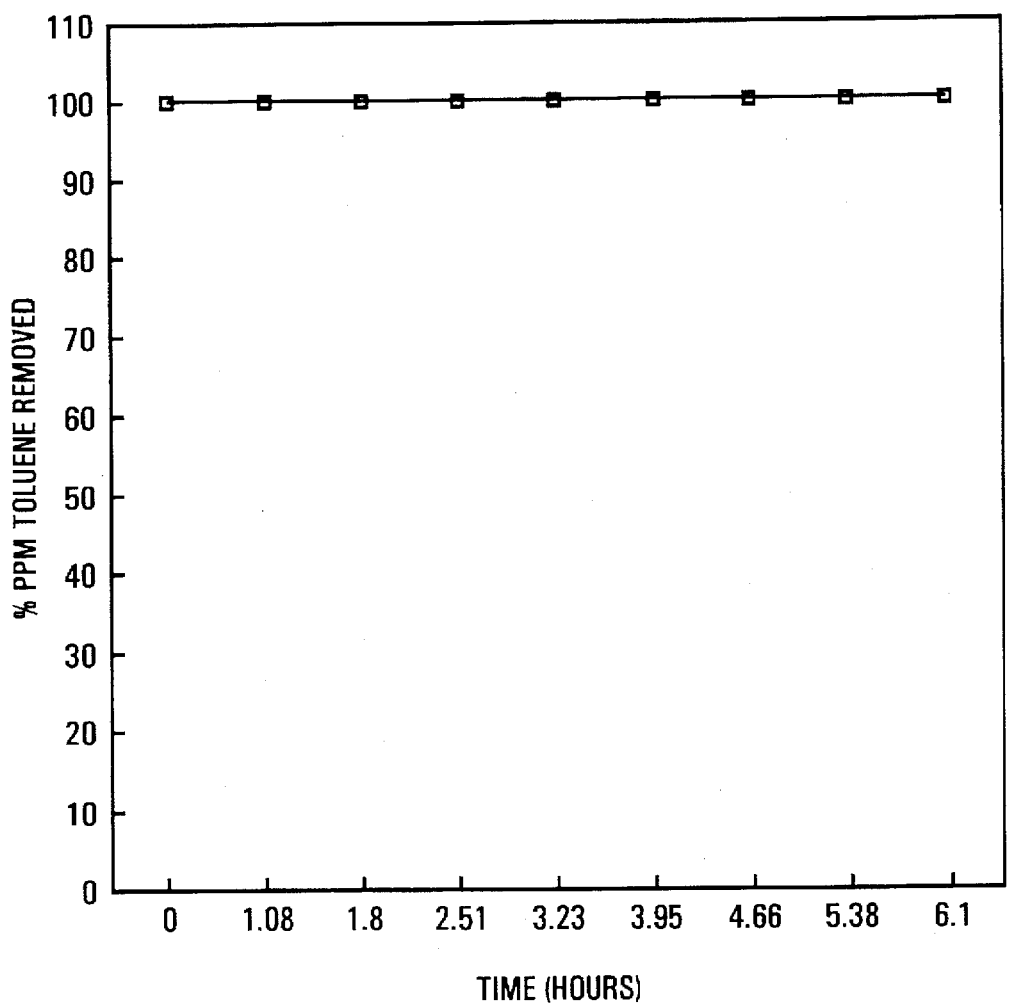
FIG. 4 is a graph which shows the column capacity for benzene as a function of time.
Figure 5:
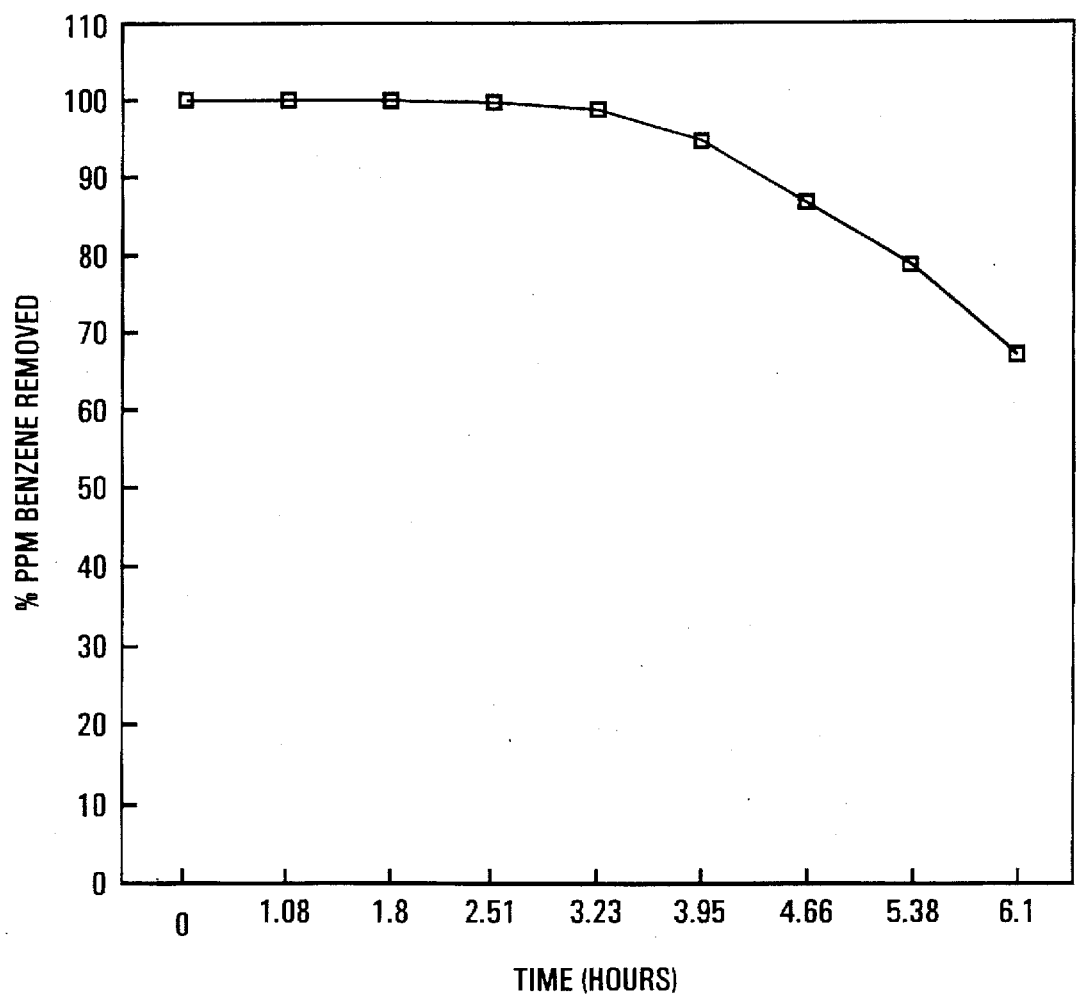
FIG. 5 is a graph which shows the column capacity for toluene as a function of time.
Figure 6:
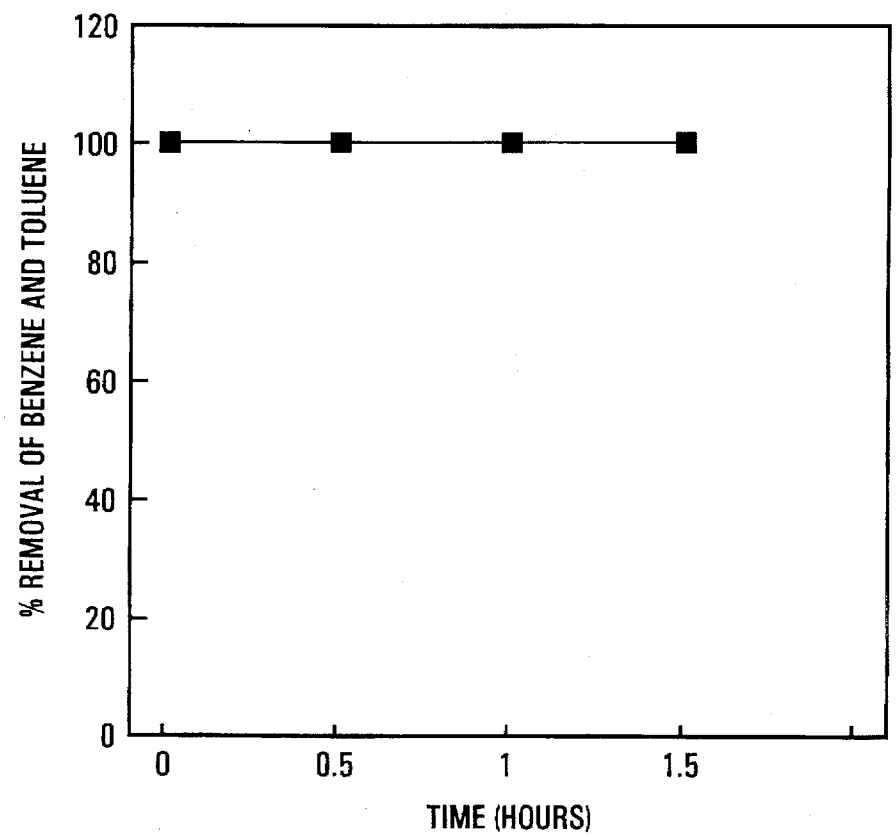
FIG. 6 is a graph which shows the column capacity for removal of benzene and toluene after regeneration.

Attention is directed to the FIGS. 1, 2 and 3 which were developed using experiments as set forth above. To determine the silane formulation, tailoring experiments were run as set forth above using varying silane concentrations and data recorded on FIGS. 4 and 5 to indicate the amount of time before the fall off of benzene removal (FIG. 4) and toluene removal (FIG. 5). The toluene removal remained at 100% even after 6.1 hours when the test was terminated.

This adsorption process is characterized by the advantage that it can operate to remove the benzenes and alkyl substituted benzenes at ambient temperatures and needs no extraordinary refrigeration or heating in order to accomplish this task.

The regeneration of the tailored zeolite bed is accomplished by draining the column and passing a heated gas, preferably nitrogen or air, upward through the packed zeolite bed to remove the BTEX from the zeolite. The temperature of the gas used to cause this regeneration may be from about 100° C. to about 120° C. with a flow rate of about 15 ml/min and an outlet pressure gauge reading of about 8 psi. The evaporated BTEX could be channeled into a cooling column, recondensed, and then collected in a holding tank for profitable use or safe disposal. In the zeolite column some of the thermal energy from the heated air is absorbed by the silane-zeolite bonds and regenerates their strength to restabilize the bed. The packed bed is cooled, refilled with ambient water, and put back on line for subsequent use when the capacity of the companion is reached, necessitating regeneration.

It is apparent there is provided in accordance with this invention a tailored zeolite sorbent, an improved method for preparing such tailored sorbent and an on-line method whereby benzene and alkyl benzenes can be successfully removed from contaminated water streams. It is further noted that the objects, aims and advantages of this invention as set forth above are accomplished by the described invention. While the invention has been described in connection with specific embodiments, it is evident that many alternatives, modifications and variations thereof would be apparent to those skilled in the art after having been instructed by the foregoing description. Accordingly, it is intended to embrace all such alternatives, modifications and variations by the appended claims as set forth.

We claim:

1. A method for removing aromatic hydrocarbon contaminants from a water stream comprising the steps of:

contacting the contaminated water stream with an effective amount of a solid sorbent material comprising a naturally occurring zeolite substrate having a coating of a primary polar silane and a secondary nonpolar silane in effective amounts for a time sufficient to remove the contaminants from the water; and separating the water substantially free of aromatic contamination from the coated zeolite.

2. The method of claim 1, wherein contacting is accomplished by flowing the contaminated water at a flow rate of contaminated water past the silane coated zeolite of from about 0.05 to about 0.2 bed volumes per minute.

3. The method of claim 1, wherein the naturally occurring zeolite is a clinoptillolite.

4. The method of claim 3, wherein the clinoptillolite includes a smectite clay mixture within its structure.

5. The method of claim 1, which further includes the step of regenerating the zeolite by sweeping the aromatic hydrocarbons from the zeolite at a temperature of from about 100° to about 120° C. with a heated gas for a sufficient time to remove the aromatic hydrocarbons.

6. The method of claim 1, wherein the coating on the zeolite further comprises an additional secondary nonpolar silane.

7. The method of claim 6, wherein the additional secondary silane is phenylmethoxy.

8. A method for removing aromatic hydrocarbon contaminants from a water stream comprising the steps of:

contacting the contaminated water stream with an effective amount of a solid sorbent material comprising a naturally occurring zeolite substrate having a coating of a primary polar silane, a secondary nonpolar silane, and an amino silane promoter in effective amounts for a time sufficient to remove the contaminants from the water, with the volume ratio of the primary silane to the secondary silane and amino silane from about 1.5:1 to about 4:1; and separating the water substantially free of aromatic contamination from the solid sorbent material.

* * * * *